(12) United States Patent
Mondet et al.

(10) Patent No.: US 7,864,891 B2
(45) Date of Patent: Jan. 4, 2011

(54) METHOD AND APPARATUS FOR ACQUIRING A FREQUENCY BURST IN A RADIO COMMUNICATION DEVICE

(75) Inventors: Mickaël Mondet, Pacé (FR); Didier Harnay, Cesson Sévigné (FR)

(73) Assignee: Silicon Laboratories Inc., Austin, TX (US)

( * ) Notice: Subject to any disclaimer, the term of this patent is extended or adjusted under 35 U.S.C. 154(b) by 800 days.

(21) Appl. No.: 11/612,477

(22) Filed: Dec. 19, 2006

(65) Prior Publication Data
US 2007/0140388 A1    Jun. 21, 2007

(51) Int. Cl.
*H04L 27/00* (2006.01)
(52) U.S. Cl. ....................................... 375/326
(58) Field of Classification Search .................. 375/344, 375/316, 356, 354, 355, 359, 362, 363, 365, 375/368; 370/509, 503, 510
See application file for complete search history.

(56) References Cited

U.S. PATENT DOCUMENTS

| | | | |
|---|---|---|---|
| 4,384,361 A | 5/1983 | Masaki | |
| 4,805,165 A | 2/1989 | Kawamura | |
| 4,870,699 A | 9/1989 | Garner | |
| 4,879,758 A | 11/1989 | DeLuca | |
| 4,930,126 A | 5/1990 | Kazecki | |
| 4,996,639 A | 2/1991 | Ishimoto | |
| 5,031,233 A | 7/1991 | Ragan | |
| 5,058,203 A | 10/1991 | Inagami | |
| 5,142,699 A | 8/1992 | Sato | |
| 5,150,361 A | 9/1992 | Wieczorek | |
| 5,151,769 A | 9/1992 | Immorlica, Jr. | |
| 5,241,541 A | 8/1993 | Farrell | |
| 5,241,688 A * | 8/1993 | Arora | 455/502 |
| 5,280,644 A | 1/1994 | Vannatta | |
| 5,307,066 A | 4/1994 | Kobayashi | |
| 5,355,524 A | 10/1994 | Higgins | |

(Continued)

FOREIGN PATENT DOCUMENTS

EP    0447302 B1    9/1991

(Continued)

OTHER PUBLICATIONS

Zhang "A Direct-Conversion Transceiver for IEEE 802.11a/b/g WLANS", IEEE CICC (Oct. 5, 2004).

(Continued)

*Primary Examiner*—Sam K Ahn
(74) *Attorney, Agent, or Firm*—Mark P Kahler

(57) ABSTRACT

A methodology for acquiring a frequency correction burst using a radio communication device including an RF circuit and digital processing circuitry is disclosed. The radio communication device employs a time period during which an signal acquisition time window is open and during which the RF circuit is activated to receive RF signals intended to be processed by the digital processing circuitry. The acquisition time window is discontinuous and includes N sub-acquisition windows during which the RF circuit is activated, wherein N≧2. The N sub-acquisition windows are separated from one another by N−1 non-acquisition time slots, during which the RF circuit is deactivated. In one embodiment, a portion of the digital processing circuitry is deactivated during those times when the RF circuit is activated.

16 Claims, 6 Drawing Sheets

U.S. PATENT DOCUMENTS

| | | | |
|---|---|---|---|
| 5,448,755 | A | 9/1995 | Tanaka |
| 5,471,471 | A | 11/1995 | Freeburg |
| 5,471,663 | A | 11/1995 | Davis |
| 5,475,684 | A | 12/1995 | Shimizu |
| 5,519,711 | A | 5/1996 | Sointula |
| 5,604,928 | A | 2/1997 | Hamano |
| 5,621,766 | A | 4/1997 | Bakke |
| 5,630,224 | A | 5/1997 | Swail |
| 5,649,160 | A | 7/1997 | Corry |
| 5,748,680 | A | 5/1998 | Mobin |
| 5,758,278 | A | 5/1998 | Landowne |
| 5,764,693 | A | 6/1998 | Taylor |
| 5,812,936 | A | 9/1998 | DeMont |
| 5,838,741 | A | 11/1998 | Callay, Jr. |
| 5,842,037 | A | 11/1998 | Haartsen |
| 5,872,540 | A | 2/1999 | Casabone |
| 5,875,449 | A | 2/1999 | Ono |
| 5,917,854 | A | 6/1999 | Taylor |
| 5,920,592 | A | 7/1999 | Tanaka |
| 5,923,761 | A | 7/1999 | Lodenius |
| 5,953,640 | A | 9/1999 | Meador |
| 6,005,857 | A | 12/1999 | Honkasalo |
| 6,020,614 | A | 2/2000 | Worley |
| 6,243,597 | B1 | 6/2001 | Dannen |
| 6,246,335 | B1 | 6/2001 | Tsunoda |
| 6,327,469 | B1 | 12/2001 | Gastra |
| 6,366,622 | B1 | 4/2002 | Brown |
| 6,349,196 | B1 | 5/2002 | Bourzeix |
| 6,393,071 | B1 | 5/2002 | Bourzeix |
| 6,480,553 | B1 | 11/2002 | Ho |
| 6,480,555 | B1 | 11/2002 | Renard |
| 6,490,262 | B1 | 12/2002 | Hogger |
| 6,498,819 | B1 | 12/2002 | Martin |
| 6,510,185 | B2 | 1/2003 | Lee |
| 2002/0021718 | A1* | 2/2002 | Kerhuel et al. .............. 370/509 |
| 2002/0080728 | A1 | 6/2002 | Sugar |
| 2003/0020521 | A1 | 1/2003 | Lee |
| 2005/0008095 | A1* | 1/2005 | Rush et al. .................. 375/296 |
| 2006/0253634 | A1 | 11/2006 | Matthews |
| 2007/0019760 | A1* | 1/2007 | Maligeorgos et al. ....... 375/327 |

FOREIGN PATENT DOCUMENTS

| | | |
|---|---|---|
| EP | 0511511 A2 | 11/1992 |
| EP | 0511511 A3 | 11/1992 |
| EP | 0511511 B1 | 11/1992 |
| EP | 0463621 B1 | 1/2000 |

OTHER PUBLICATIONS

U.S. Appl. No. 10/426,042, filed Apr. 29, 2003, by Navdeep Sooch and G. Tyson Tuttle, entitled "Highly Integrated Radio-Frequency Apparatus and Associated Methods".

* cited by examiner

METHOD AND APPARATUS FOR ACQUIRING A FREQUENCY BURST IN A RADIO COMMUNICATION DEVICE

RELATED PATENT APPLICATIONS

This patent application claims priority to French Patent Application No. 0512977, filed Dec. 20, 2005 in France, entitled "Method for acquiring a frequency correction burst using a radio communication device, and corresponding radio communication device" which is incorporated herein by reference in its entirety.

FIELD OF THE INVENTION

The field of the invention is radio communication systems, particularly but not exclusively those radio communication systems employing for example one of the following standards: GSM ("Global System for Mobile Communication"), GPRS ("General Packet Radio Services"), EDGE ("Enhanced Data Rate for GSM Evolution"), and GERAN ("GSM/EDGE Radio Access Network").

More specifically, the disclosed technology relates to a method for acquiring a frequency correction burst using a radio communication device in a radio communication system.

A frequency burst is a period of an RF carrier modulated by a data stream. In other words, a burst represents the physical contents of a time slot. A predetermined number of time slots (8 in the case of GSM) form a TDMA ("Time Division Multiple Access") frame. The recurrence of a particular time slot (for example time slot number 0) in each frame makes up a physical channel. Several logical channels may be multiplexed on the same physical channel by using a multi-frame structure, such as a 51 frame channel, for example.

A radio communication system includes base stations that can communicate with a great number of mobile stations (also referred to as radio communication devices). The base stations periodically transmit a reference signal, known as a frequency correction burst (or FB in GSM terminology). Each base station transmits this frequency correction burst (FB) on its beacon frequency, also referred to as ARFCN C0 ("Absolute Radio Frequency Channel Number C0") or BCCH carrier ("Broadcast Control Channel") in GSM terminology.

More specifically and as illustrated in FIG. 1, in the case of GSM, each base station transmits a frequency correction burst (FB) during time slot number 0 of each of the frames numbered 0, 10, 20, 30 and 40 of a multi-frame MF channel of 51 frames numbered from 0 to 50, thereby forming an FCCH logical channel ("Frequency Correction Channel" in GSM terminology). For the sake of simplicity, the time slots of each frame are not shown in FIG. 1.

The frequency correction burst (FB) is the first burst searched for by the mobile stations. It allows the mobile stations to synchronize themselves with the base stations while having a two-fold purpose: frequency calibration and coarse synchronization. First, with regard to frequency calibration, the frequency correction burst (FB) makes it possible for the frequency (or error) offset to be corrected between the local carrier frequency of the mobile station and the carrier frequency of the base station. Moreover, with regard to coarse synchronization, an approximate time alignment with the beginning of the frequency correction burst (FB) is completed so that fine tuning can be performed during a later acquisition of a synchronization burst (SB) from the base station.

Further details concerning the frequency correction burst (FB) are found in the specifications of normative document 3GPP 05.02. "Technical Specification Group GSM/EDGE Radio Access Network; Multiplexing and multiple access on the radio path".

BACKGROUND

Usually, in order to acquire a frequency correction burst (FB), a radio communication device opens an acquisition time window during which an RF circuit (radio frequency circuit) is activated in order to receive RF signals. Then, the RF signals received are analyzed in order to locate a frequency correction burst (FB) and compensate for the frequency or time difference.

Usually the acquisition time window is continuous and has a slightly longer duration than the maximum duration between two frequency correction bursts (FB) transmitted successively.

Thus, as illustrated in FIG. 1, in the case of GSM in which a frequency correction burst (FB) is repeated every ten or eleven frames (transmitted in each of the frames numbered 0, 10, 20, 30 and 40, but not in the frame numbered 50, of a multi-frame MF having 51 frames) an acquisition time window 1a, 1b is generally used whose duration is 11.125 frames (that is, eleven frames plus a time slot). FIG. 1 illustrates two examples. In the first example, the acquisition time window 1a begins just after a frequency correction burst (FB) and makes it possible to detect the next frequency correction burst (FB) that is 10 frames from the previous frequency correction burst (FB). In the second example, the acquisition time window 1b begins just after a frequency correction burst (FB) and makes it possible to detect the next frequency correction burst (FB) that is 11 frames from the previous frequency correction burst (FB).

The standard technique therefore includes choosing a continuous acquisition time window whose duration is minimized in order to reduce the acquisition time of a frequency correction burst (FB).

This standard technique is not always optimal, particularly when the radio communication device operates in such a way that at least part of the digital processing means (processor, DSP, etc.) of this radio communication device is deactivated when the acquisition time window is open (that is, when the RF circuit of this same radio communication device is activated), and is activated when the acquisition time window is closed (that is, when the RF circuit is deactivated).

Such an operation involves performing a time domain isolation (TDI) between the RF activities and the digital processing activities. This concept (TDI) is described in further detail below as well as in U.S. patent applications Ser. Nos. 10/955,569, 10/955,584 and 10/954,791. It is intended to improve the performance of the analog RF circuit that is very sensitive to sound and interference. In some applications, the RF circuit must be able to detect very low amplitude signals (a few micro-volts). If the RF circuit is in a noisy environment, it is possible that reception performance will be substantially degraded. Now, the radio communication devices include digital processing circuits, like a digital signal processor (DSP), to find the frequency correction burst (FB) signal, and a microcontroller unit (MCU) to manage all the operations performed by the device. These digital processing circuits generate noise that can interfere significantly with the operation of the RF circuit if it is placed near the digital processing circuits. This is the case, for example, when digital processing circuits and the RF circuit are integrated on one common integrated circuit (also called a chip) or on at least two integrated circuits mounted very close to one another and packaged together (in a multi-chip module (MCM), for example).

One drawback of this time domain isolation technique (TDI) is that the digital processing circuits that are deactivated when the acquisition time window is open cannot support real time applications because they are deactivated for very long periods of time. For example, in the case of GSM, the length of the acquisition time window is 11.125 frames, that is, approximately 55 ms, which is a stop duration that is too long for some digital processing circuits (DSP, processor, etc.) to operate in real time.

The main objective of the disclosed technology is to overcome these various drawbacks of the prior art.

More specifically, one of the objectives of the disclosed technology is to provide a frequency correction burst (FB) acquisition technique using a radio communication device, this technique reducing the duration of each continuous time period for the activation of the RF circuit included in the radio communication device.

Another objective of the disclosed technology, in at least one embodiment, is to provide such a technique which, in the aforementioned context of the time domain isolation technique (TDI), can deactivate for a shorter period of time the digital processing circuits included in the radio communication device, namely those digital processing circuits which are deactivated when the acquisition window is open.

Another objective of the disclosed technology, in at least one embodiment, is to provide such a technique that is simple to implement and inexpensive.

Yet another objective of the disclosed technology, in at least one embodiment, is to provide such a technique that does not significantly modify performance in terms of frequency correction burst (FB) acquisition time.

SUMMARY

These various objectives, as well as others which will become more apparent below, are achieved according to an embodiment of the disclosed technology using a method for acquiring a frequency correction burst (FB) using a radio communication device including an RF circuit and a digital processing circuit, the method including a time period during which an acquisition time window is open and during which the RF circuit is activated in order to receive RF signals intended to be processed by the digital processing circuit. The acquisition time window is discontinuous and includes N sub-acquisition windows, with $N \geq 2$, during which the RF circuit is activated, and separated from one another by N−1 non-acquisition time slots during which the RF circuit is deactivated.

The general principle behind this embodiment of the invention therefore involves replacing the continuous acquisition time window from the prior art with a discontinuous acquisition time window, itself including a plurality of sub-windows separated from one another by non-acquisition time slots (sometimes also referred to as "slots" below).

Many structures could be used as the discontinuous acquisition window according to the disclosed technology. Indeed, all that is needed is N sub-acquisition windows and the N−1 non-acquisition time slots to guarantee 100% frequency correction burst (FB) detection.

In other words, the structure of the discontinuous acquisition window of the disclosed technology must be such that at least one of the frequency correction bursts (FB) is completely contained in one of its sub-acquisition windows.

It is worth noting that the RF circuit may be deactivated in many ways: power down, neutralization or disabling, standby, inhibiting, etc. Thus, in some cases, the RF circuit is considered deactivated although it is powered up because the RF signals that it receives are ignored by the digital processing means.

Advantageously, the RF circuit is deactivated once a frequency correction burst has been detected.

Preferably, at least part of the digital processing circuit is deactivated during the sub-acquisition windows, and activated during the non-acquisition time slots.

Thus, the disclosed technology is particularly, but not exclusively, suitable in the context of time domain isolation (TDI). Indeed, in this context, the disclosed technology can reduce the inactivity time ranges of some digital processing circuits (namely those that are deactivated during the sub-acquisition windows), and may possibly even allow them to operate in real time.

Preferably, the digital processing circuit includes a first digital processing apparatus that detects a frequency correction burst in RF signals received by the RF circuit, and second digital processing apparatus that performs processing functions other than the detection of a frequency correction burst. Moreover, the second digital processing apparatus is deactivated during the sub-acquisition windows and activated during the non-acquisition time slots. Advantageously, the first digital processing apparatus is activated during the sub-acquisition windows and deactivated during the non-acquisition time slots. The first digital processing apparatus is deactivated once a frequency correction burst has been detected. Advantageously, the RF circuit and the digital processing circuit are integrated on one single integrated circuit in one embodiment. According to one advantageous embodiment, the RF circuit and the digital processing circuit are integrated on at least two integrated circuits packaged together.

In a first advantageous embodiment of the invention, where the frequency correction burst is repeated every ten or eleven frames in frames numbered 0, 10, 20, 30 and 40 of a multi-frame structure including 51 frames numbered from 0 to 50, the discontinuous acquisition time window includes N/2 first cycles each having a duration of one frame. Each first cycle includes one first sub-acquisition window having a duration greater than one half-frame and a first non-acquisition time slot. Each first cycle exhibits a time lag having a duration of one half-frame. The discontinuous acquisition time window further includes N/2 second cycles each having a duration of one frame. Each second cycle includes a second sub-acquisition window having a duration equal to the duration of each first sub-acquisition window, and a second non-acquisition time slot having a duration equal to the duration of each first non-acquisition time slot.

One advantage of this first embodiment is that the digital processing circuit that is deactivated when the RF circuit is activated is reactivated with each frame. They are therefore compatible with systems in which the processing function of the next frame is prepared during the processing of a frame, and may easily perform processing functions in real time. Another advantage of this first embodiment is that it uses a discontinuous acquisition window structure that is relatively regular (one single time lag) and is therefore simple and inexpensive to implement. Advantageously, when each frame includes eight unit time slots, each first or second sub-acquisition window has a duration of five unit time slots, and each first or second non-acquisition time slot has a duration of three unit time slots. The duration of the non-acquisition time slots are thereby maximized, and the operational duration of the digital processing circuit deactivated when the RF circuit is activated is thereby maximized. Advantageously, N/2 equals 11, in one embodiment.

In a second advantageous embodiment of the invention, where the frequency correction burst is repeated every ten or eleven frames, in frames numbered 0, 10, 20, 30 and 40 of a multi-frame structure including 51 frames numbered from 0 to 50, the discontinuous acquisition time window includes two parts each including k cycles each having a duration of 10.5/k frames, each cycle including one sub-acquisition frame having a duration greater than or equal to (10.5/k−n) frames, and a non-acquisition time slot having a duration that is less than or equal to n frame, with $n \leq 0.5$.

One advantage of this second embodiment is that it uses a discontinuous acquisition window structure that is regular (no time lag) and is therefore simpler and less expensive to implement than the discontinuous acquisition window structure of the first embodiment. On the other hand, with this second embodiment, the digital processing circuit that is deactivated when the RF circuit is activated is less active than in the first embodiment. Indeed, the ratio of the total cumulative duration of the sub-acquisition windows and the total cumulative duration of the non-acquisition time slots is smaller in the second embodiment than in the first embodiment. Advantageously, each frame includes eight unit time slots and wherein n equals 0.5. The duration of the non-acquisition time slots is thereby maximized, and the operating time of the digital processing circuit deactivated when the RF circuit is activated is maximized. In a first embodiment example of the aforementioned second embodiment, k equals 7. In a second embodiment example of the aforementioned second embodiment, k equals 3.

In another embodiment, the disclosed technology also relates to a radio communication device of the type including frequency correction burst acquisition circuitry and including an RF circuit, digital processing circuit, and circuitry that opens an acquisition time window during which the RF circuit is activated in order to receive RF signals intended to be processed by the digital processing circuit. The acquisition time window is discontinuous and includes N sub-acquisition windows, with $N \geq 2$, during which the RF circuit is activated, and separated from one another by N−1 non-acquisition time slots during which the RF circuit is deactivated. More generally, the disclosed radio communication device includes circuitry that implements the method for acquiring a frequency correction burst as described above (in any one of its various embodiments).

BRIEF DESCRIPTION OF THE DRAWINGS

Other features and advantages of the invention will become apparent from the following description of a preferable embodiment of the invention given by way of non-limiting example, and in the appended drawings in which.

DETAILED DESCRIPTION

The disclosed technology therefore relates to a frequency correction burst (FB) acquisition technique using a radio communication device including an RF circuit and digital processing circuit (integrated on one shared integrated circuit or on at least two integrated circuits packaged together).

The general feature of the disclosed methodology includes opening a discontinuous acquisition time window including N sub-acquisition windows separated from one another by N−1 non-acquisition time slots, with $N \geq 2$. During each of the sub-acquisition windows, the RF circuit is activated in order to receive RF signals intended to be processed by the digital processing circuit. During each of the non-acquisition time slots, the RF circuit is deactivated.

The disclosed methodology is particularly suited to be combined with the aforementioned concept of time domain isolation (TDI) between the RF circuit and at least part of the digital processing circuit. Indeed, the disclosed methodology distinguishes itself from the technique in the prior art in that it has non-acquisition time slots during which digital processing circuits may be activated (since the RF circuit is deactivated). In other words, the disclosed methodology can reduce the length of inactivity of the aforementioned part of the digital processing circuit.

Figure 6:
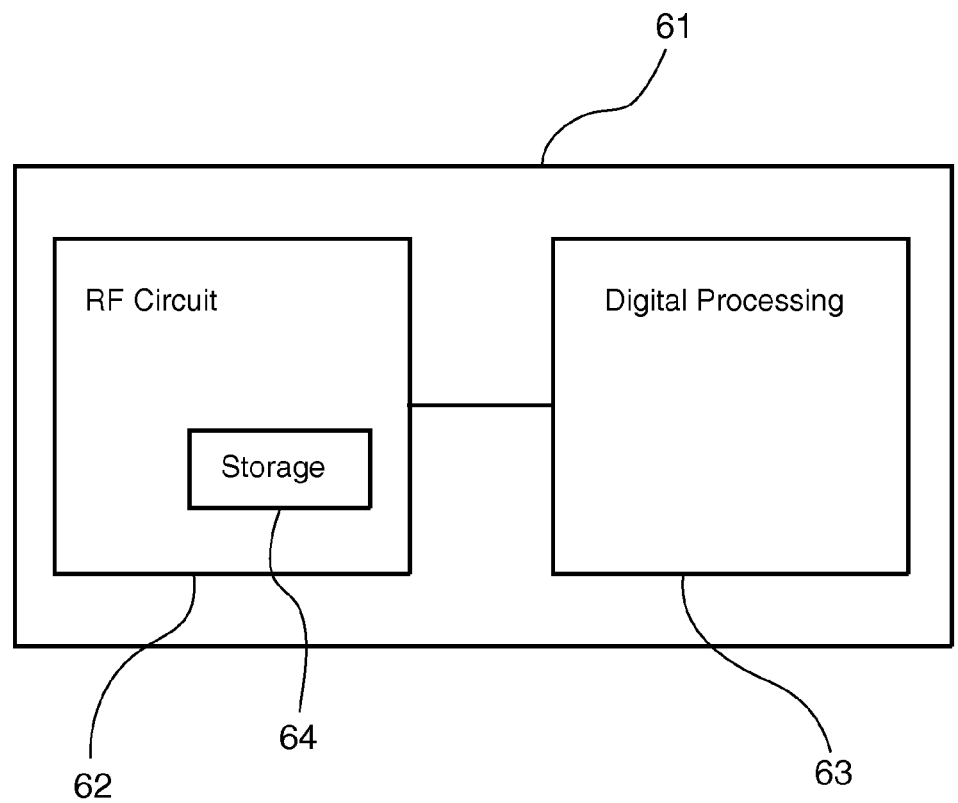
FIG. 6 is a block diagram of a first particular embodiment of a radio communication device according to the disclosed technology.

In a first particular embodiment of the invention, of which an example is given in FIG. 6, all of the digital processing circuitry 63 is deactivated during the sub-acquisition windows and activated during the non-acquisition time slots. This therefore involves the radio communication device 61 including a buffer storage 64 to store RF signal data received through the RF circuit 62 during the sub-acquisition windows, these data then being used by the digital processing circuitry 63 during the non-acquisition time slots. In this case, because they are activated during the non-acquisition time slots (and therefore they are not deactivated too long each time), the digital processing circuitry 63 may in some cases detect in real time a frequency correction burst (FB) using the RF signals received.

In the example in FIG. 6, the buffer storage 64 is located in the RF circuit 62. It could also be placed elsewhere. In general, the buffer storage may be located in the RF circuit 62, in the digital processing circuit 63, or in a module (not shown in FIG. 6) interfacing the RF circuit 62 and the digital processing circuitry 63. In yet other embodiments, the buffer storage may be distributed over several of the three aforementioned entities.

Figure 7:
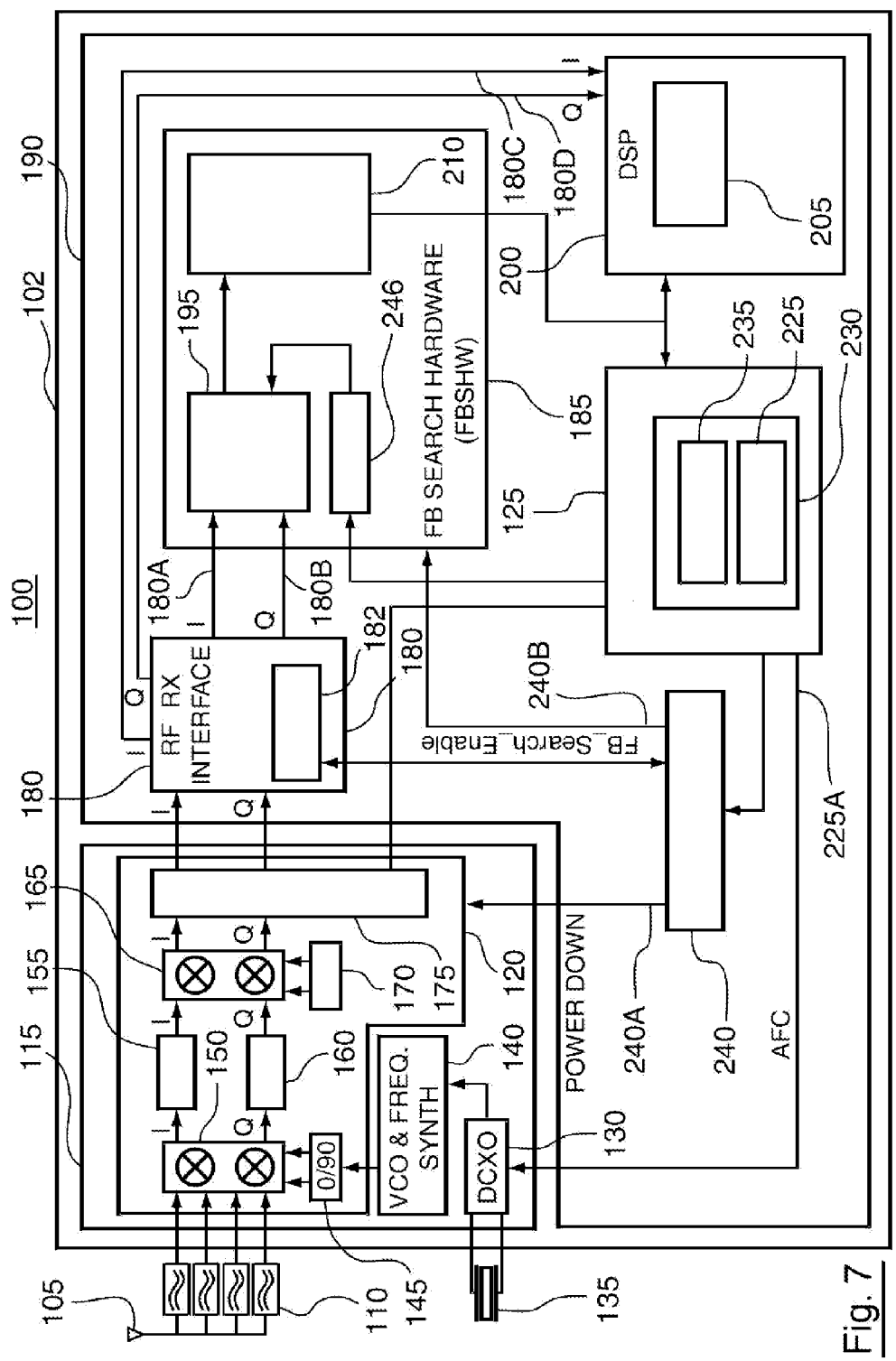
FIG. 7 is a block diagram of a second particular embodiment of a radio communication device according to the disclosed technology.

In a second particular embodiment of the disclosed technology, of which an example is given in FIG. 7, the digital signal processing circuitry 190 includes: frequency burst (FB) detection digital processing circuitry 185 that can detect a frequency burst (FB) in RF signals received through the RF circuit 115, and other digital processing circuitry 125, 200, that can perform processing functions other than the detection of a frequency correction burst (FB). During the sub-acquisition windows, the FB detection digital processing circuitry 185 activates while the other digital processing circuitry 125, 200 is deactivated. Conversely, during the non-acquisition time slots, the other digital processing circuitry 125, 200 is activated while the FB detection digital processing circuitry 185 is deactivated. In this case, because they are activated at the same time as the RF circuit, the FB detection digital processing circuitry 185 may easily detect in real time a frequency correction burst (FB) through the RF signals received.

Below, three examples of acquisition time window structures according to the disclosed methodology are described in relation to FIGS. 2-4. In these examples, the radio communication device is a radio communication system that meets the GSM standard. It should be understood however that the disclosed methodology is in no way limited to this standard, however.

A first embodiment of an acquisition time window according to the invention will now be described in relation to FIG. 2.

Figure 1:
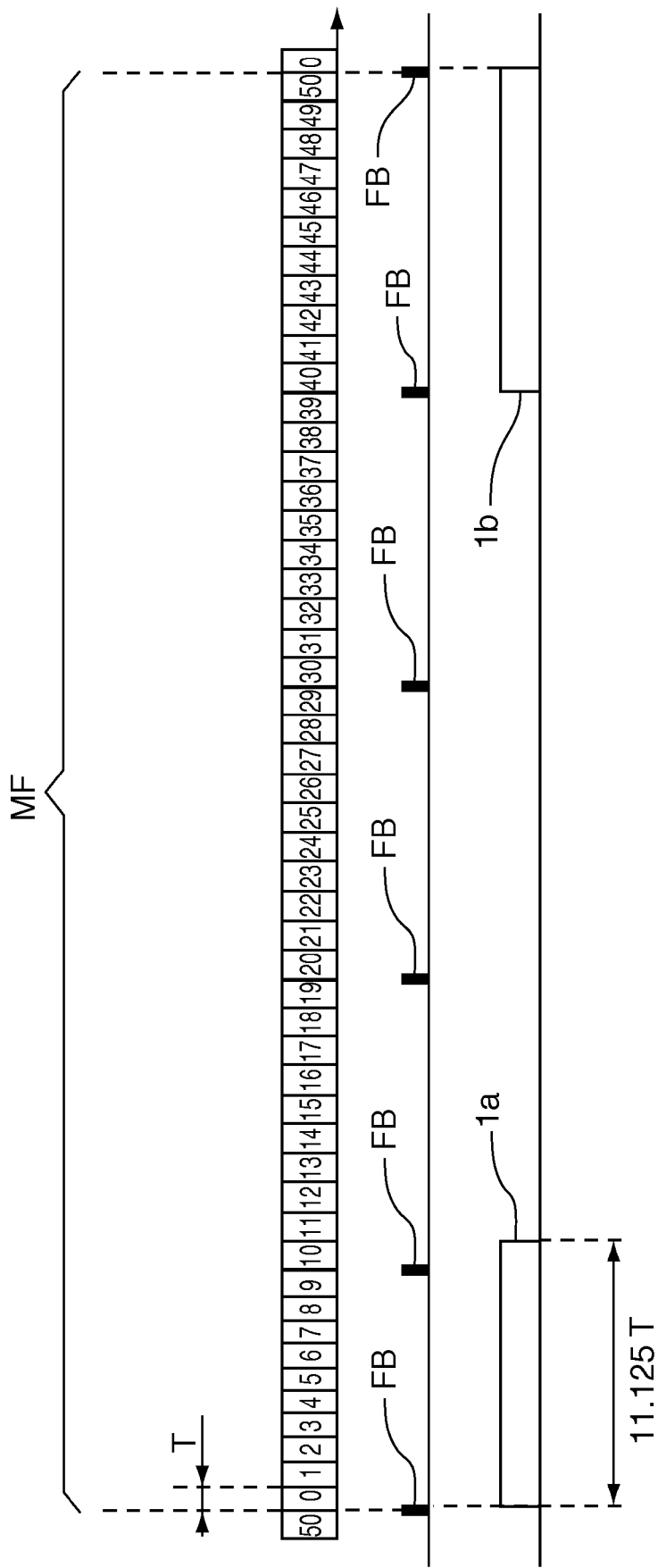
FIG. 1 depicts an example of an acquisition time window according to the prior art.
Figure 2:
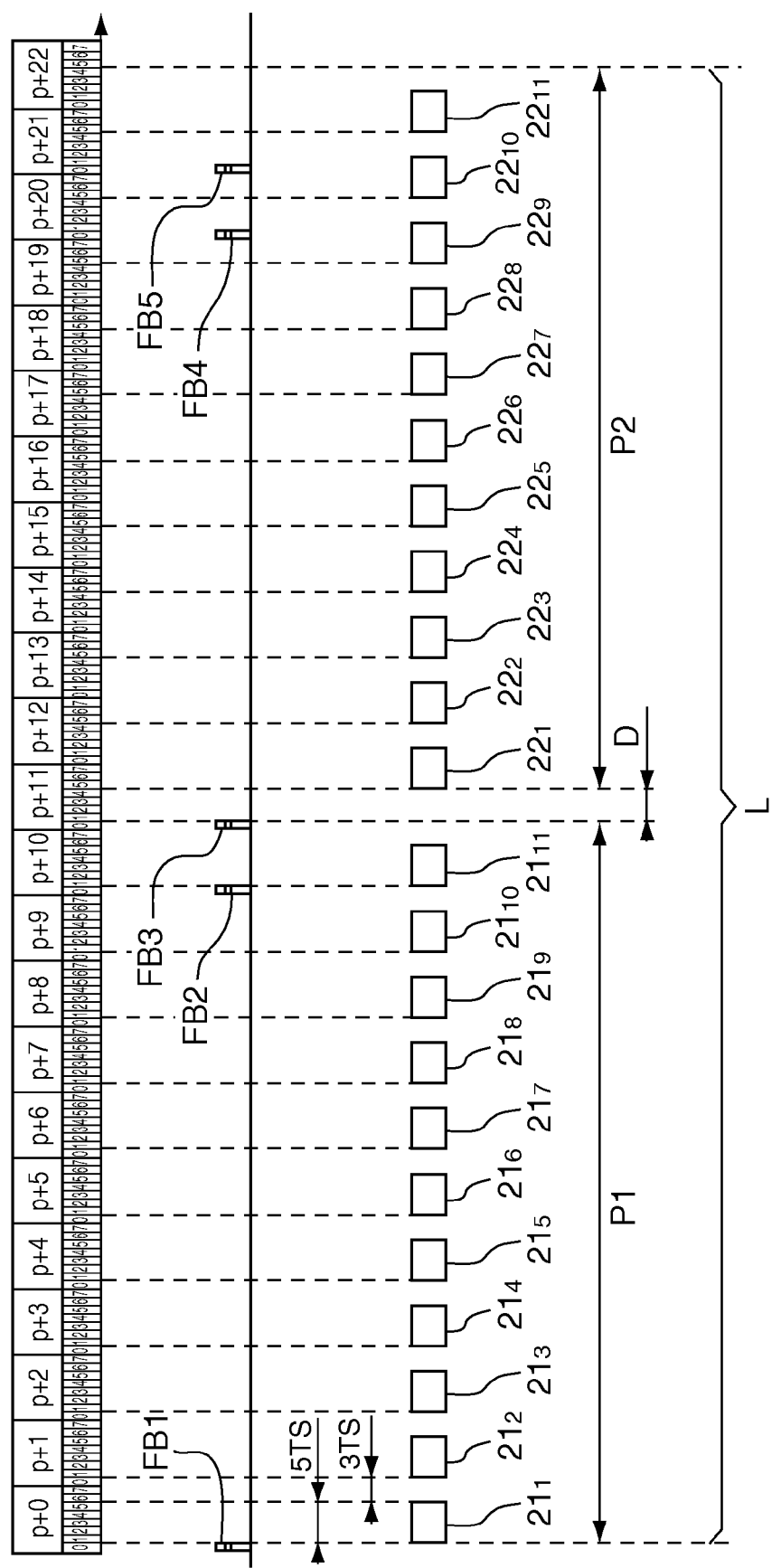
FIGS. 2, 3 and 4 each depict a separate embodiment of an acquisition time window according to the disclosed technology.

For the sake of simplicity, only 23 successive frames (numbered p+0 through p+22) of a multi-frame structure having 51 frames have been depicted in the upper part of FIG. 2. Each frame includes 8 acquisition unit time slots (marked TS, for "time slots") numbered from 0 to 7.

To show the structure of the acquisition window, the most unfavorable situation is shown with the assumption that the first sub-acquisition window 211 opens just after a first frequency correction burst FB1 is transmitted.

In simpler terms, the central part of FIG. 2 simultaneously depicts two possible cases for the moments when frequency correction bursts are transmitted after burst FB1:
first case (p ∈{0, 10, 20, 30}: burst FB1 is 10 frames from the next frequency correction burst FB2, and burst FB2 is itself 10 frames from the next frequency correction burst FB4;
second case (p=40): burst FB1 is 11 frames from the next frequency correction burst FB3, and burst FB3 is itself 10 frames from the next frequency correction burst FB5.

In this first embodiment, the discontinuous acquisition time window has a total length L of 22.5 frames and includes:
11 first cycles (with a total cumulative length P1 of 11 frames) each having a duration of one frame (8 TS), each first cycle having a first sub-acquisition window $21_i$, with i∈{1 ... 11}, having a duration of five unit time slots (5 TS), and a first non-acquisition time slot having a duration of three unit time slots (3 TS);
a time lag having a duration D of one half-frame (4 TS);
11 second cycles (with a total cumulative length P2 of 11 frames) each having a duration of one frame, each second cycle having a second sub-acquisition window $22_i$, with i∈{1 ... 11}, having a duration of five unit time slots (5 TS), and a second non-acquisition time slot having a duration of three unit time slots (3 TS).

The position, modulo one frame, from the beginning of a frequency correction burst is unknown. If this burst is in the first part of a frame (side view of reception, that is, the side of the radio communication device), it will be detected by one of the 11 first sub-acquisition windows $21_i$. If not, it will be detected by one of the 11 second sub-acquisition windows $22_i$.

Figure 5:
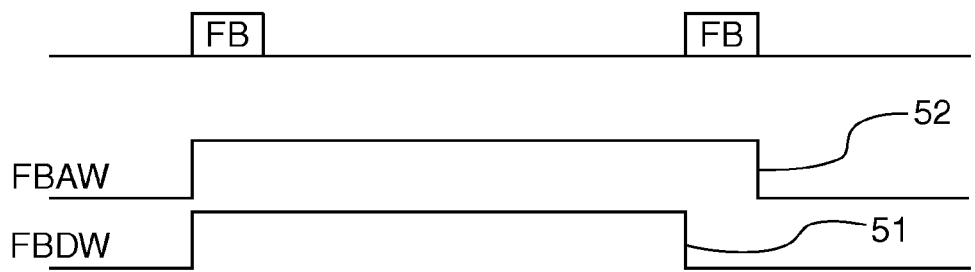
FIG. 5 depicts the known concepts of an acquisition time window and a detection time window.

Note that each sub-acquisition window, because it has a duration of five unit time slots (5 TS), can detect a frequency correction burst which begins during the sub-detection window that makes up the first four of these five unit time slots. Indeed, as shown in FIG. 5, a detection window (or FBDW for "Frequency Burst Detection Window") 51 is always shorter than the corresponding acquisition window (or FBAW for "Frequency Burst Acquisition Window") 52 by one unit time slot (1 TS), since a frequency correction burst FB must be completely received in order for detection to be possible.

A second embodiment of an acquisition time window according to the invention will now be described in relation to FIG. 3.

Figure 3:
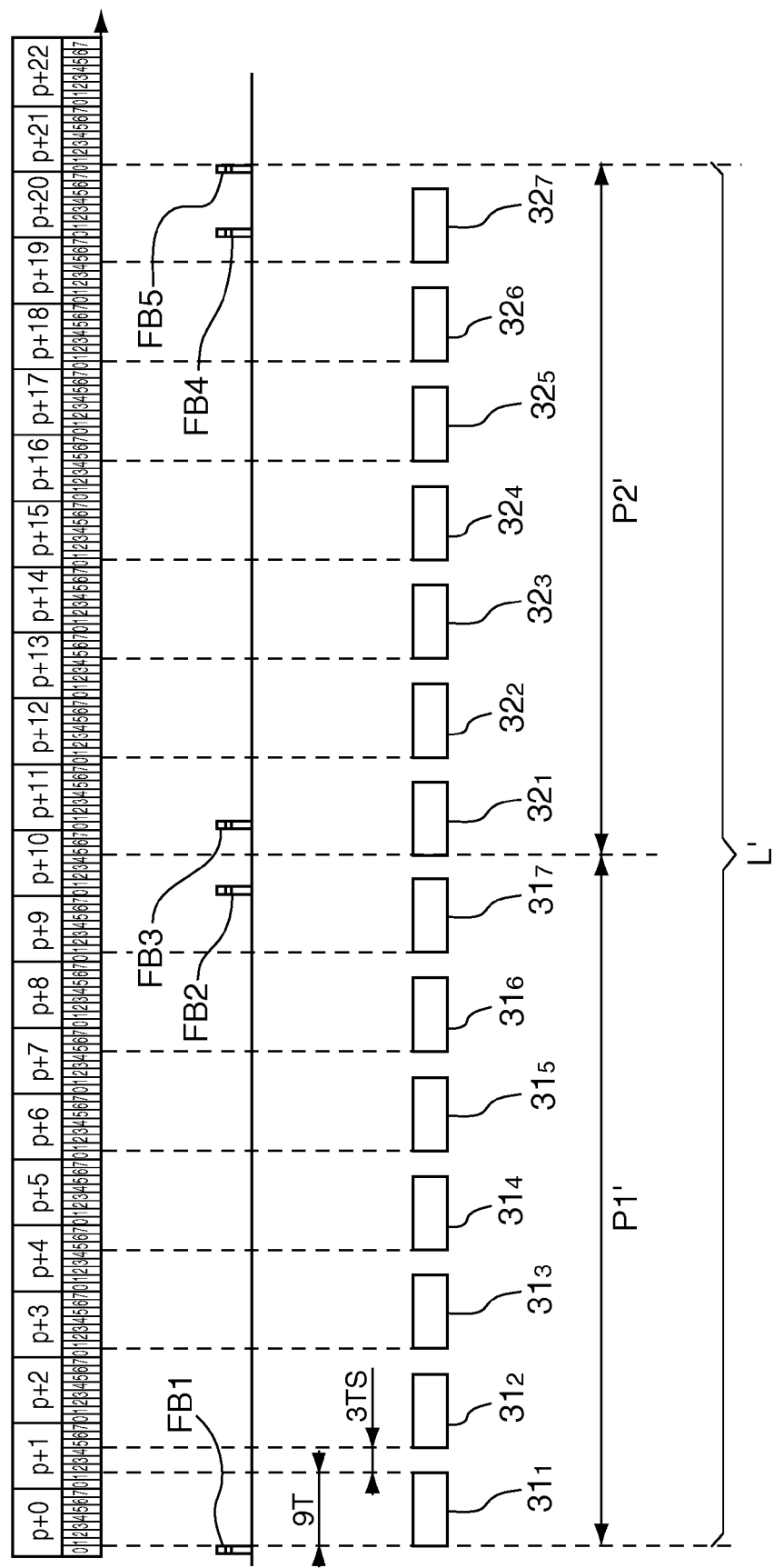

The upper parts (depiction of 23 successive frames numbered p+0 through p+22) and central parts (depiction of five frequency correction bursts FB1 through FB5) in FIG. 3 are identical to those in FIG. 2. They will therefore not be described again.

In this second embodiment, the discontinuous acquisition time window has a total length L' of 21 frames and includes two parts each having a total cumulative length (P1' and P2' respectively) of 10.5 frames. Each part comprises 7 cycles (k=7) each having a duration of 1.5 frames (1.5=10.5/k, with k=7). Each cycle comprises a sub-acquisition window ($31_i$ or $32_i$, with i∈{1 ... 7}) having a duration of 9 unit time slots ((10.5/k−n) frames, with w=3/8 and k=7), and a non-acquisition time slot having a duration of 3 unit time slots (3 TS).

This structure is such that if the discontinuous acquisition time window begins just after a frequency correction burst (FB1 in FIG. 3), then the next frequency correction burst (FB2 or FB3, depending on whether they are 10 or 11 frames apart) does not fall into a "slot" (non-acquisition time slot). For that, a "slot" is placed 10.5 frames after the beginning of the discontinuous acquisition time window, and this "slot" is chosen with a width smaller than or equal to one half-frame (4 TS). In the example in FIG. 3, this "slot" has a length of 3 TS. According to one embodiment, it has a length of 4 TS in order to maximize the activation periods of the digital processing means.

A third embodiment of an acquisition time window according to the invention will now be described in relation to FIG. 4.

Figure 4:
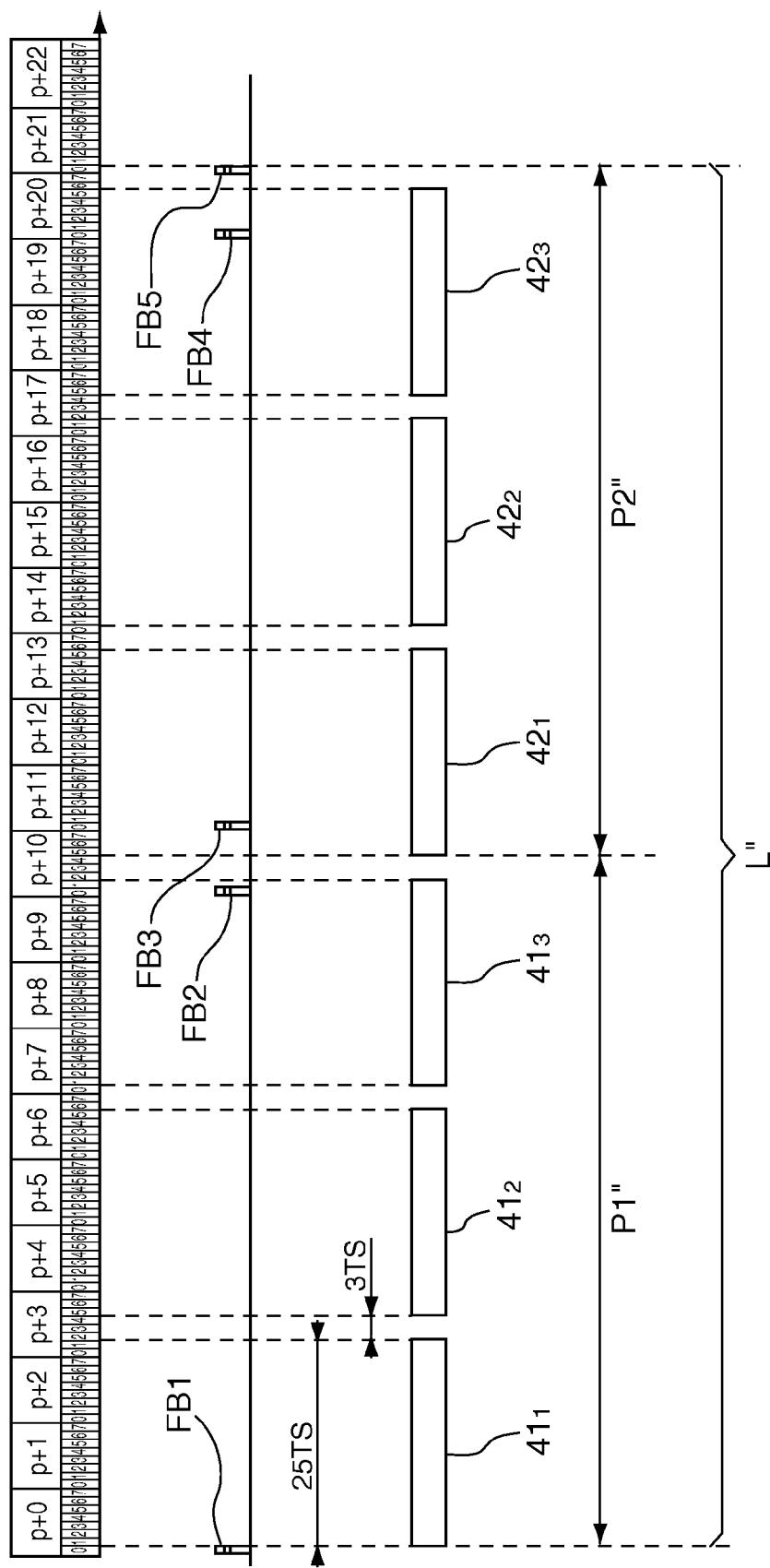

The upper parts (depiction of 23 successive frames numbered p+0 to p+22) and central parts (depiction of five frequency correction bursts FB1 through FB5) in FIG. 4 are identical to those in FIG. 2. They therefore will not be described again.

In this third embodiment, the discontinuous acquisition time window has a total length L" of 21 frames and includes two parts each having a total cumulative length (P1" and P2" respectively) of 10.5 frames. Each part includes 3 cycles (k=3) each having a duration of 3.5 frames (3.5=10.5/k, with k=3). Each cycle includes a sub-acquisition window ($41_i$ or $42_i$, with i∈{1 ... 3}) having a duration of 25 unit time slots ((10.5/k−n) frames, with n=3/8 and k=3), and a non-acquisition time slot having a duration of 3 unit time slots (3 TS).

This structure is such that if the discontinuous acquisition time window begins just after a frequency correction burst (FB1 in FIG. 4), then the next frequency correction burst (FB2 or FB4, depending on whether they are 10 or 11 frames apart) does not fall into a "slot" (non-acquisition time slot). For that, a "slot" is placed 10.5 frames after the beginning of the discontinuous acquisition time window, and this "slot" is chosen with a width smaller than or equal to one half-frame (4 TS). In the example in FIG. 4, this "slot" has a length of 3 TS. According to one embodiment, it has a length of 4 TS in order to maximize the activation periods of the digital processing means.

The radio communication device depicted in FIG. 7 will now be described in detail. As previously indicated, it is an example of a radio communication device according to a second particular embodiment of the disclosed technology.

Recall that this second embodiment can be distinguished from the first embodiment (depicted in FIG. 6) in that, within the digital signal processing circuitry 190, the FB detection digital processing circuitry 185 can detect a frequency correction burst (FB) in the RF signals received through the RF circuit, and other digital processing circuitry 125, 200 can perform processing functions other than the detection of a frequency correction burst (FB).

More specifically, the radio communication device 100 (a cellular telephone, for example) includes an RF circuit 115 (that is, a transceiver system) and a signal processing circuit 190 (that is, a baseband processing circuit). The RF circuit 115 and the signal processing circuit 190 may be on a same integrated circuit 102 (case depicted in FIG. 7) or on two integrated circuits packed together (in a multi-chip module, for example).

The RF circuit 115 includes an antenna 105 that is connected to a surface acoustic wave filter 110 (or SAW filter for "Surface Acoustic Wave"). In the embodiment depicted, the SAW filter 110 is configured to select a radio frequency (RF) signal located in one of four bands, namely the GSM 850, E_GSM 900, DCS 1800 and PCS 1900 MHz bands. A person skilled in the art will know how to easily adapt this embodiment to other frequency bands. In practice, the antenna 105 and the filter 110 may be located externally to the integrated circuit 102.

The SAW filter 110 is coupled to a receiver 120 within the RF circuit 115. For the sake of simplicity, the transmitter of the RF circuit 115 has been omitted in FIG. 7.

The digital signal processing circuit 190 includes a microcontroller 125 (or MCU for "Micro-Controller Unit") which controls the operation of sub-blocks of the radio communication device 100. The microcontroller 125 is depicted as having an automatic frequency output (AFC) 225A which is coupled to an input of DCXO oscillator (digitally controlled crystal oscillator) 130, to control the operation of this oscillator. However, the line connecting the AFC output 225A and the DCXO oscillator 130 is a logical connection. In practice, the microcontroller 125 writes frequency adjustment information in a peripheral (not shown) and this peripheral communicates this information to an RF control port (not shown) of the RF circuit 115. The AFC output 225A may be located either in the microcontroller 125, or in the DSP processor 200 discussed below. A crystal 135 is coupled to the DCXO oscillator 130 to provide the oscillator with a basic time reference. The DCXO oscillator 130 provides a reference frequency signal to a frequency synthesizer 140 to which it is coupled. The output of this synthesizer 140 is coupled via a 0°/90° phase shifter 145 to an analog mixer 150. Thus, when the output signal from the phase shifter 145 is combined with the signal received by the analog mixer 150, the signal is separated into two components, one into in-phase (I) and the other into quadrature (Q).

The in-phase (I) and quadrature (Q) components are converted from analog to digital by analog/digital converters, 155 and 160 respectively. The resultant digital signals I and Q are provided to the digital mixer 165 which is coupled to a low intermediate frequency block 170 to convert the digital signals I and Q into baseband frequencies. A dual-mode filter 175 is coupled to the digital mixer 165 to separate the baseband I and Q signals of the adjacent signals located outside the bandwidth of the filter.

Outputs I and Q of the filter 175 are coupled to an RF receiver interface 180 with the RF receiver 120. Note that outputs I and Q of the filter 175 are also RF circuit 115 outputs. To minimize noise, in one particular embodiment, only the storage portion of interface 180 is active when the RF circuit 115 is active. This storage portion includes write logic (not shown) and RAM memories of an FB circular buffer 182. However, when the DSP processor 200 is activated, the entire interface module 180 is activated.

First outputs I and Q (referenced 180A and 180B) of interface 180 are coupled to a frequency correction burst search hardware block, referenced 185 and hereinafter referred to as "FBSHW block" (for Frequency Burst Search Hardware").

The FBSHW block 185 determines the position of a frequency correction burst (FB) when the receiver 120 is tuned for the first time to a particular frequency channel. The FBSHW block 185 is located in the signal processing circuit 190.

Second outputs I and Q (referenced 180C and 180D) of the interface module 180 are coupled to the digital signal processor (or DSP) 200 which, when activated, estimates the frequency offset (referenced 205) to adjust the frequency of the receiver 120 when a frequency correction burst search is performed.

In a particular embodiment of the invention, the second outputs I and Q (referenced 180C and 180D) are activated when the DSP processor 200 is activated. The FBSHW block 185 is dedicated to searching in real time for a frequency correction burst (FB) when the RF circuit 115 is activated while the microcontroller 125 and the DSP processor 200 are kept inactive to control noise. The FBSHW block 185 and interface 180 are, for example, digital circuits that generate less noise than the relatively high level of noise generated by other digital circuits such as the DPS processor 200 and the microcontroller 125 when they are activated. This low noise level generated by the FBSHW block 185 is low enough that it does not interfere significantly with the operation of the receiver 120.

The FBSHW block 185 includes an autocorrelation computation unit (ACOR) 195 to which are coupled outputs I and Q of the interface module 180. Any continuous offset (DC offset) that the I and Q signals may contain may be removed in the ACOR unit 195 on the basis of the value in a DC offset register 246 programmed by the microcontroller 125. One objective of the FBSHW block 185 is to distinguish between a frequency correction burst (FB) signal on a particular channel and an interferer. On the BCCH channel of GSM/GPRS, each frequency correction burst (FB) lasts one time slot while other types of bursts generated from quasi-random data are transmitted before and after the frequency correction burst (FB). Thus, a relatively sharp or relatively high peak appears in the magnitude of the autocorrelation coefficients of the signal received when it reaches the end of a frequency correction burst (FB). When the position of this peak is determined, a coarse synchronization of the frequency correction burst (FB) is performed.

An interferer may be a continuous wave signal (CW) or any other undesired narrowband signal that lasts much longer than a frequency correction burst (FB). By observing the profile of the autocorrelation values of the signal received, the FBSHW block 185 can distinguish between the GSM signal desired and a narrowband interferer.

The FBSHW block 185 includes a section 210 of a frequency correction burst (FB) location state machine that checks the profile to find the sharp peak in the values of the autocorrelation function (that is, the aforementioned coefficients computed by the ACOR block 195).

After the frequency correction burst (FB) has been located, an automatic frequency correction unit (AFC) 225 of a synchronization state machine 230 in the microcontroller 125 uses this result to adjust the programming value of the DCXO oscillator 130. This indirectly modifies the carrier frequency of the RF circuit 115 by adjusting a clock associated with the frequency synthesizer 140.

The synchronization state machine 230 also includes a frequency correction burst (FB) scheduling unit 235 which controls the synchronization and the duration of an acquisition window according to the disclosed technology, that is, including:

sub-acquisition windows during which the circuit 115 (and more specifically the receiver 120) is activated to listen to a desired channel in order to detect a frequency correction burst (FB); and non-acquisition time slots (between the sub-acquisition windows) during which the RF circuit 115 (and more specifically the receiver 120) is deactivated.

According to one particular embodiment of the disclosed methodology, during the sub-acquisition windows, the RF circuit 115 is activated while the DSP processor 200 and the microprocessor 125 are deactivated. Conversely, during the non-acquisition time slots, the DSP processor 200 and the microcontroller 125 are activated while the RF circuit 115 is deactivated.

The signal processing circuit 190 also includes a time management unit (STU for "System Timer Unit") 240 which is coupled to the microcontroller 125 to receive timing instructions for the device from the latter. In one particular embodiment, the time management unit is always on. It includes:

a power down output 240A which is coupled to the RF circuit 115 so the RF circuit may be activated or deactivated. It is therefore because of this power down output 240A that the time management unit 240 manages the sub-acquisition windows and the non-acquisition time slots; and a frequency correction burst search enable output (FB_Search_Enable) 240B which is coupled to the FBSHW block 185 so the FBSHW block 185 may be notified that a frequency correction burst search window must be opened and that a frequency correction burst must be detected.

In one embodiment, the search window coincides with the acquisition window and includes a plurality of sub-search windows each coinciding with one of the sub-acquisition windows. In other words, in this embodiment, the receiver 120 and the FBSHW block 185 are both activated and deactivated at the same time.

In one embodiment, the search window is independent of the acquisition window. In other words, the search window may be opened before or after the acquisition window is opened, and may be closed before or after the acquisition window is closed. Moreover, it is possible to not distribute the search window into several sub-search windows. In other words, in this case, the receiver 120 and the FBSHW block 185 are activated and deactivated independently of one another.

Modifications and alternative embodiments of this invention will be apparent to those skilled in the art in view of this description of the invention. Accordingly, this description teaches those skilled in the art the manner of carrying out the invention and is intended to be construed as illustrative only. While GSM embodiments have been described, those skilled in the art will appreciate that the methods taught herein can be applied to other systems as well. The forms of the invention shown and described constitute the present embodiments. Persons skilled in the art may make various changes in the shape, size and arrangement of parts. For example, persons skilled in the art may substitute equivalent elements for the elements illustrated and described here. Moreover, persons skilled in the art after having the benefit of this description of the invention may use certain features of the invention independently of the use of other features, without departing from the scope of the invention.

What is claimed is:

1. A method for acquiring a frequency correction burst using a radio communication device, the method comprising:

receiving RF signals, by an RF circuit, to provide received RF signals;

processing, by digital processing circuitry, the received RF signals, the digital processing circuitry including first and second digital processing circuits; and controlling, by a time management unit, the RF circuit to activate the RF circuit to provide an acquisition time window during which the RF circuit receives RF signals intended to be processed by the digital processing circuitry, wherein the acquisition time window is discontinuous and includes N sub-acquisition windows during which the RF circuit is activated and during which the first digital processing circuit is activated to detect the frequency correction burst while the second digital processing circuit is deactivated, the sub-acquisition windows of the acquisition time window being separated from one another by N−1 non-acquisition time slots during which the RF circuit is deactivated, wherein N≧2.

2. The method of claim 1, further comprising:

detecting the frequency correction burst, by the first digital processing circuit, during the acquisition time window, and deactivating, by the time management unit, the RF circuit after the first digital processing circuit detects the frequency correction burst.

3. The method of claim 2, wherein the second digital processing circuit is deactivated during the sub-acquisition windows, and activated during the non-acquisition time slots.

4. The method of claim 3, further comprising:

detecting, by the first digital processing circuit, the frequency correction burst in RF signals received by the RF circuit; and performing, by the second digital processing circuit, functions other than detecting the frequency correcting burst, wherein the second digital processing circuit is deactivated during sub-acquisition windows and activated during the non-acquisition time slots.

5. The method of claim 4, wherein the first digital processing circuit is deactivated during the non-acquisition time slots.

6. The method of claim 4, wherein the first digital processing circuit is deactivated after a frequency correction burst has been detected.

7. The method of claim 1, wherein the RF circuit and the digital processing circuitry are integrated on one single integrated circuit.

8. The method of claim 1, wherein the RF circuit and the digital processing circuitry are integrated on at least two integrated circuits packaged together.

9. A radio communication device comprising:

an RF circuit that receives RF signals that include a frequency correction burst, thus providing received RF signals;

digital processing circuitry, coupled to the RF circuit, that processes the received RF signals, the digital processing circuitry including first and second digital processing circuits; and a time management unit, coupled to the RF circuit and the digital processing circuitry, to activate the RF circuit to provide an acquisition time window during which the RF circuit receives RF signals intended to be processed by the digital processing circuitry, wherein the acquisition time window is discontinuous and includes N sub-acquisition windows during which the RF circuit is activated and during which the first digital processing circuit is activated to detect the frequency correction burst while the second digital processing circuit is deactivated, the sub-acquisition windows of the acquisition time window being separated from one another by N−1 non-acquisition time slots during which the RF circuit is deactivated, wherein N≧2.

10. The radio communication device of claim 9, wherein the first digital processing circuit detects the frequency correction burst during the acquisition window, and the time management unit deactivates the RF circuit after the first digital processing circuit detects the frequency burst.

11. The radio communication device of claim 9, wherein the second digital processing circuit is deactivated during the sub-acquisition windows, and activated during the non-acquisition time slots.

12. The radio communication device of claim 11, wherein the first digital processing circuit detects the frequency correction burst in RF signals received by the RF circuit, and wherein the second digital processing circuit performs functions other than detecting the frequency correction burst, the second digital processing circuit being deactivated during sub-acquisition windows and activated during the non-acquisition time slots.

13. The radio communication device of claim 12, wherein the first digital processing circuit is deactivated during the non-acquisition time slots.

14. The radio communication device of claim 12, wherein the first digital processing circuit is deactivated after a frequency correction burst has been detected.

15. The radio communication device of claim 9, wherein the RF circuit and the digital processing circuitry are integrated on one single integrated circuit.

16. The radio communication device of claim 9, wherein the RF circuit and the digital processing circuitry are integrated on at least two integrated circuits packaged together.

\* \* \* \* \*